United States Patent
Chung et al.

(10) Patent No.: US 10,906,573 B2
(45) Date of Patent: Feb. 2, 2021

(54) ELECTRICALLY DRIVEN MOVING VEHICLE

(71) Applicant: NAVER LABS CORPORATION, Seongnam-si (KR)

(72) Inventors: Jinwon Chung, Seongnam-si (KR); Sangok Seok, Seongnam-si (KR); Inhyeok Kim, Seongnam-si (KR); Dongil Choi, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 98 days.

(21) Appl. No.: 15/796,023

(22) Filed: Oct. 27, 2017

(65) Prior Publication Data

US 2018/0118245 A1 May 3, 2018

(30) Foreign Application Priority Data

Oct. 28, 2016 (KR) .......................... 10-2016-0142063
Oct. 28, 2016 (KR) .......................... 10-2016-0142089

(51) Int. Cl.
  *B62B 5/06* (2006.01)
  *B62D 51/04* (2006.01)
  *B62B 5/00* (2006.01)

(52) U.S. Cl.
  CPC .............. *B62B 5/06* (2013.01); *B62B 5/0033* (2013.01); *B62B 5/0043* (2013.01); *B62B 5/0073* (2013.01)

(58) Field of Classification Search
  CPC ....... B62B 5/06; B62B 5/0033; B62B 5/0043; B62B 5/0073; B62B 5/0069; B62D 51/04; B62D 51/001

(Continued)

(56) References Cited

U.S. PATENT DOCUMENTS 4,697,661 A * 10/1987 Pajerski ............... A61B 6/4405
                                                              180/19.3
5,746,282 A *  5/1998 Fujiwara ............... B60K 26/02
                                                              180/6.2
(Continued)

FOREIGN PATENT DOCUMENTS

EP        0707842 A1 *  4/1996  ............. B62D 51/04
JP        61-157059       9/1986
(Continued)

OTHER PUBLICATIONS

Korean office action issued in Korean Patent App. No. 10-2016-0142089 dated Aug. 22, 2017.
(Continued)

*Primary Examiner* — Anne Marie M Boehler
(74) *Attorney, Agent, or Firm* — Greer, Burns & Crain, Ltd.

(57) ABSTRACT

An electrically driven moving vehicle includes a main body on which an article to be transported is loaded, and a handle provided on one side of the main body. A pair of force sensor units are provided in the handle. A force applied by a user is sensed by the pair of force sensor units to control the operation of electric motors. The user can operate the electrically driven moving vehicle while holding a position convenient for the user rather than a specific position of the handle. In addition, the user can conveniently operate the electrically driven moving vehicle with only one hand, without using both hands.

7 Claims, 15 Drawing Sheets

(58) Field of Classification Search
USPC .............................. 180/19.1, 19.3, 320, 333
See application file for complete search history.

(56) References Cited

U.S. PATENT DOCUMENTS

| | | | | |
|---|---|---|---|---|
| 6,276,471 | B1* | 8/2001 | Kratzenberg | ......... B62B 5/0026 180/19.3 |
| 8,672,081 | B2* | 3/2014 | Kume | ................... B62B 5/0026 180/19.1 |
| 2006/0048980 | A1* | 3/2006 | Kataoka | .................. B62B 3/001 180/19.2 |
| 2006/0272406 | A1* | 12/2006 | Murakami | ................ G01L 5/22 73/379.01 |
| 2007/0131461 | A1* | 6/2007 | Treadwell | ............... B62B 5/005 180/19.1 |
| 2015/0066277 | A1* | 3/2015 | Kojina | .................. B62B 5/0073 701/22 |
| 2015/0209204 | A1* | 7/2015 | Hsu | ........................ B62D 51/04 180/19.1 |
| 2018/0244294 | A1* | 8/2018 | Ochiai | .................. B62B 5/0073 |

FOREIGN PATENT DOCUMENTS

| | | |
|---|---|---|
| JP | 2006168490 A | 6/2006 |
| JP | 2011245958 A | 12/2011 |
| JP | 2015-160451 | 9/2015 |
| JP | 5860658 | 12/2015 |
| JP | 2016137823 A | 8/2016 |
| KR | 100922134 B1 | 10/2009 |
| KR | 2020120001845 U | 3/2012 |

OTHER PUBLICATIONS

Korean office action issued in Korean Patent App. No. 10-2016-0142063 dated Aug. 22, 2017.
Japanese Office Action issued in Japanese App. No. 2017-204179, dated Oct. 2, 2018.

* cited by examiner

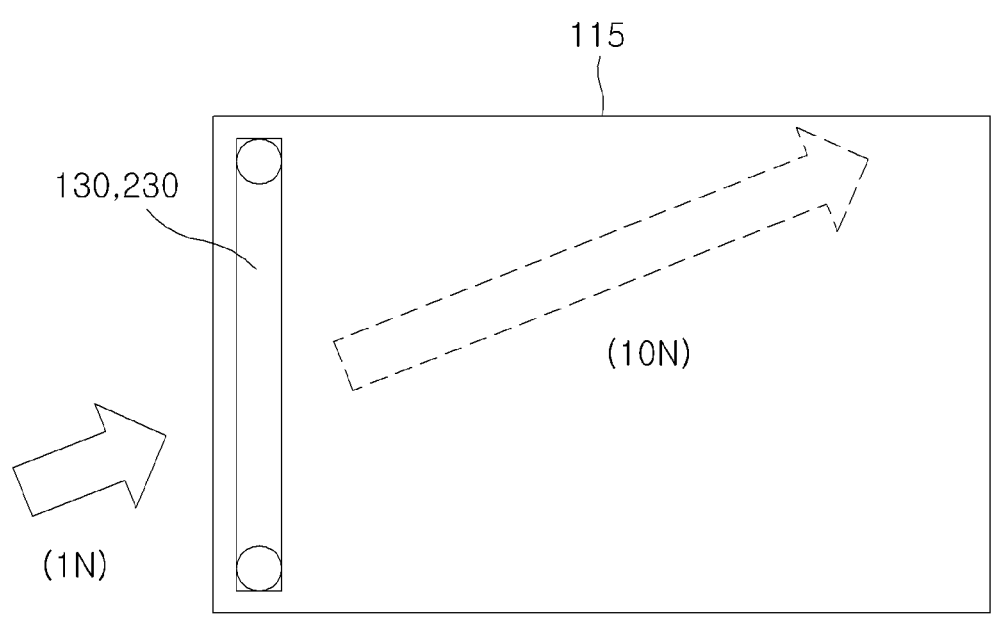

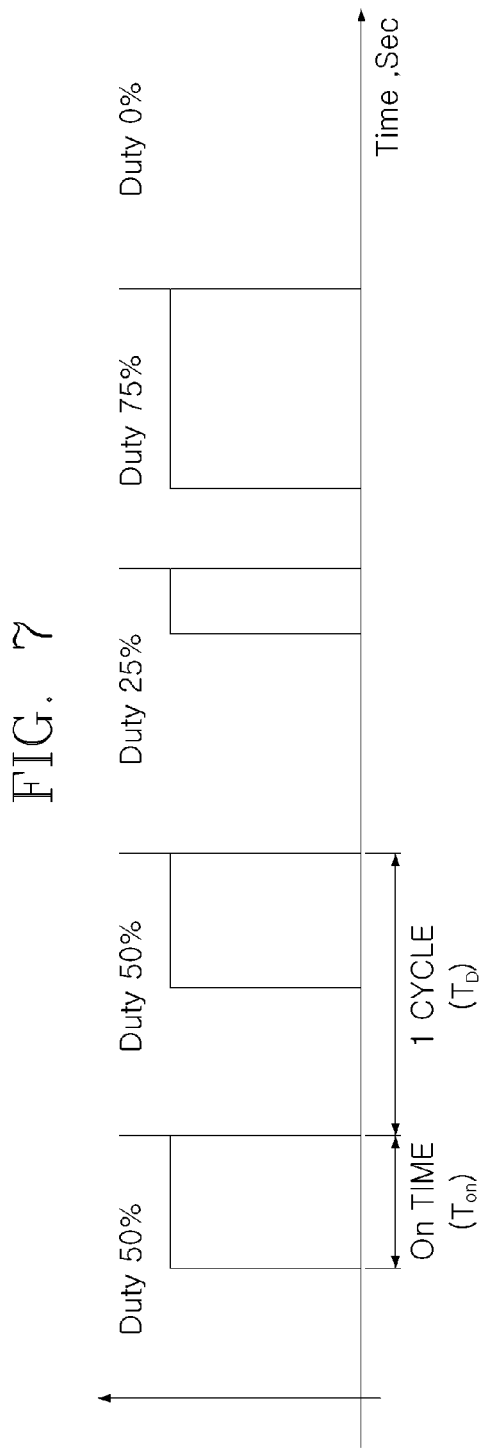

ELECTRICALLY DRIVEN MOVING VEHICLE

CROSS-REFERENCE TO RELATED APPLICATION

This application claims the benefit of Korean Patent Application Nos. 10-2016-0142063 and 10-2016-0142089, filed on Oct. 28, 2016, in the Korean Intellectual Property Office, the disclosures of which are incorporated herein in their entirety by reference.

BACKGROUND OF THE INVENTION

Field of the Invention

The present invention relates to an electrically driven moving vehicle, and more particularly, to an electrically driven moving vehicle which is conveniently operable while a user uses only one hand or holds a position convenient for the user rather than a predetermined specific position.

Description of the Related Art

Recently, there have been many cases where a moving vehicle such as a cart is used to carry articles for various purposes in shopping malls, delivery services, and industrial fields. However, when heavy articles are loaded on the moving vehicle such as the cart, a user has to apply considerable force to the moving vehicle so as to move the moving vehicle. Further, it is more difficult to move the moving vehicle in a desired direction by appropriately operating the moving vehicle on which heavy articles are loaded. Consequently, there is a considerable difficulty in transporting the articles.

In this regard, a method of moving a cart by a motor or the like provided in the cart as a driving unit has been attempted.

For example, a cart may be provided with a joystick or the like for indicating a traveling direction, and the joystick or the like may be used to drive the motor. A pair of throttles used for a motorcycle handle or the like may be provided as a handle of the cart. In this case, when a user rotates the throttles, motors corresponding to the throttles are driven to move the cart. However, in such cases, unlike an operating method of pushing or pulling the handle of a cart without a motor, a separate operation must be performed, which may cause inconvenience to a user.

In this regard, Korean Utility Model Publication No. 20-2012-0001845 discloses an electrically driven cart which includes a pair of left and right handles, senses a force applied to the left and right handles, and drives a pair of left and right driving motors according to the sensed force, whereby the electrically driven cart can travel.

However, in this case, a user has to operate the left and right handles with both bands. Thus, when the user wants to operate the electrically driven cart with one hand while performing another operation, such as lifting an article, with the other hand, the user can operate only one of the left and right handles, which makes it impossible to appropriately control the electrically driven cart.

In addition, in the above case, recognition is possible only when the force applied by the user is applied to the left and right handles. Thus, when the user wants to operate the electrically driven cart by gripping a portion other than the left and right handles, it is difficult to perform appropriate control.

In addition, Korean Patent Registration No. 10-0922134 discloses an electrically moving vehicle which includes handle sensors on a handle, the handle sensors including a left forward sensor, a left reverse sensor, a right forward sensor, and a right reverse sensor, and senses a gripping force of a user, and drives a pair of driving motors by using the sensed gripping force of the user to thereby control a driving speed and direction.

However, in this case, the user has to hold and operate the position of the predetermined handle sensor. Accordingly, when the user holds and operates another position such as the side of the handle, the handle sensor cannot sense the gripping force of the user. Consequently, it is difficult to appropriately control the electrically driven moving vehicle.

Further, when the user wants to move the electrically driven vehicle with one hand while performing another operation, such as lifting an article, with the other hand, only one of the left and right sensors can sense the gripping force of the user. Therefore, it may be impossible to appropriately control the electrically driven moving vehicle.

SUMMARY OF THE INVENTION

One or more embodiments of the present invention provide an electrically driven moving vehicle for loading and moving an article to be transported, which allows a user to easily operate the electrically driven moving vehicle even with one hand, without using both hands.

One or more embodiments of the present invention provide an electrically driven moving vehicle for loading and moving an article to be transported, which allows to a user to operate the electrically driven moving vehicle while holding a position convenient for the user rather than a specific position of a handle.

In one embodiment, an electrically driven moving vehicle for loading and moving an article to be transported includes: a main body including a pair of driving wheels arranged on the left and right sides of the main body, and a pair of electric motors configured to drive the pair of driving wheels; a pair of force sensor units provided on the left and right sides of the main body; a handle including a connection part connecting the pair of force sensor units; and a control unit configured to control driving of the pair of electric motors by taking into account a force sensed by the pair of force sensor units.

In another embodiment, an electrically driven moving vehicle for loading and moving an article to be transported includes: a main body including a pair of driving wheels arranged on the left and right sides of the main body, a pair of electric motors configured to drive the pair of driving wheels, and a loading plate on which the article to be transported is loaded; a handle provided on one side of the main body; a pair of force sensor units provided near the left and right ends of the handle, proximate the upper portion of the loading plate and configured to sense a force applied to the handle by the user and transferred to the main body; and a control unit configured to control the driving of the pair of electric motors by taking into account the force transferred to the main body.

BRIEF DESCRIPTION OF THE DRAWINGS

The above and other objects, features and other advantages of the present invention will be more clearly understood from the following detailed description taken in conjunction with the accompanying drawings, in which:

FIGS. 6A, 6B, and 6C are diagram for describing a process of driving the electrically driven moving vehicle according to a force applied by a user, according to an embodiment of the present invention;

FIG. 7 is a diagram for describing the case of controlling a current by using a pulse width modulation (PWM) signal, according to an embodiment of the present invention;

DETAILED DESCRIPTION OF THE INVENTION

Hereinafter, various modifications can be made to the present invention, and specific embodiments will be described with reference to the accompanying drawings.

While describing the present invention, detailed descriptions about related well-known functions or configurations that may diminish the clarity of the points of the present invention are omitted.

Also, it will be understood that although the terms "first", "second", etc. may be used herein to describe various components, these components should not be limited by these terms. These components are only used to distinguish one component from another.

Hereinafter, electrically driven moving vehicles according to embodiments of the present invention will be described in detail with reference to the accompanying drawings.

Figure 1:
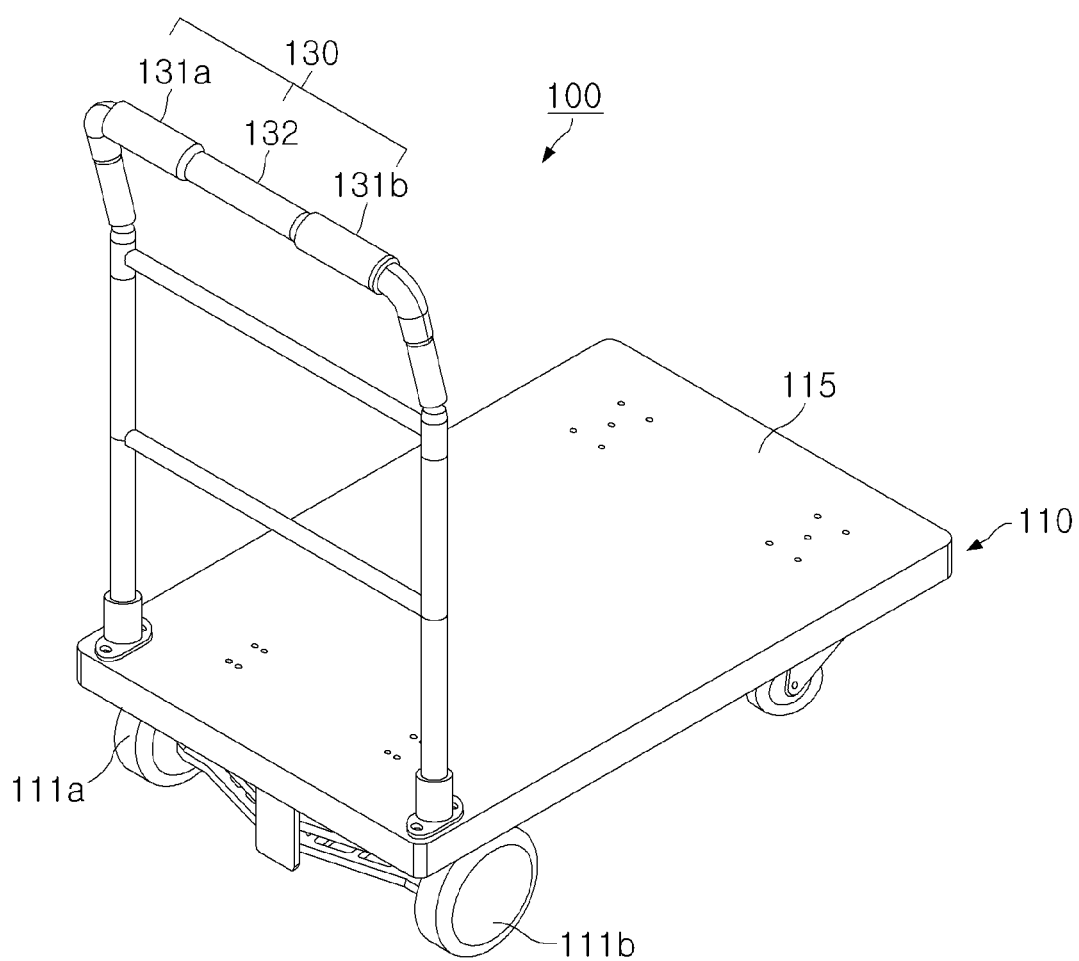
FIG. 1 is a perspective view of an electrically driven moving vehicle according to an embodiment of the present invention.
Figure 2:
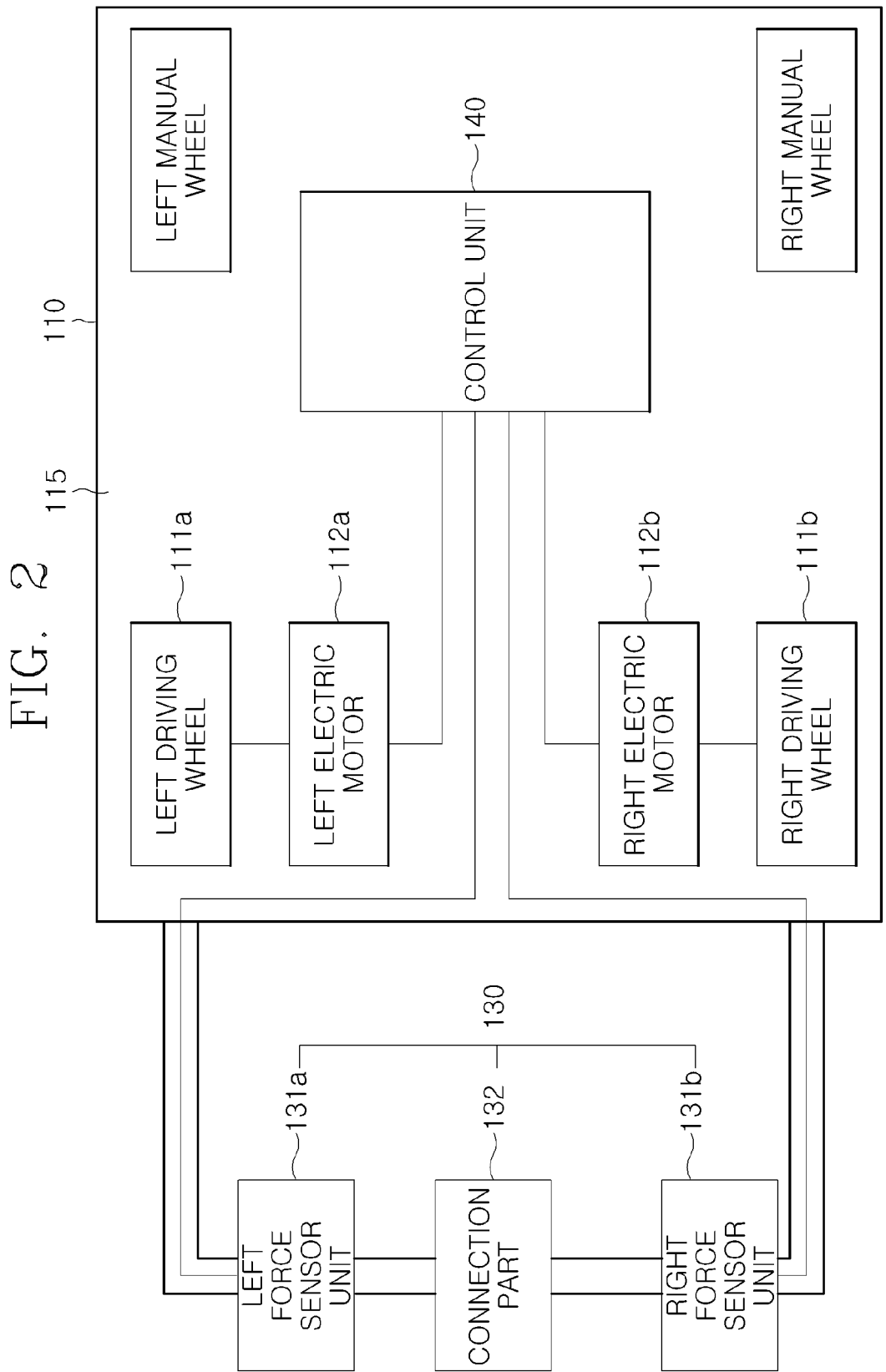
FIG. 2 is a configuration diagram of the electrically driven moving vehicle according to an embodiment of the present invention.

FIG. 1 is a perspective view of an electrically driven moving vehicle 100 according to an embodiment of the present invention. Also, FIG. 2 is a configuration diagram of the electrically driven moving vehicle 100 according to an embodiment of the present invention. The electrically driven moving vehicle 100 according to an embodiment of the present invention will be described below with reference to FIGS. 1 and 2.

Referring to FIGS. 1 and 2, the electrically driven moving vehicle 100 according to an embodiment of the present invention is an electrically driven moving vehicle for loading and moving an article to be transported, and includes: a main body 110 including a pair of driving wheels 111a, 111b arranged one on the left side and the other on the right side of the main body 110, and a pair of electric motors 112a, 112b each configured to drive corresponding one of the pair of driving wheels 111a, 111b; a pair of force sensor units 131a, 131b provided on the left side and the right side of a handle 130 including a connection part 132 connecting the pair of force sensor units 131a, 131b; and a control unit 140 configured to control the driving of the pair of electric motors 112a, 112b by taking into account a force sensed by the pair of force sensor units 131a, 131b.

Hereinafter, each component of the electrically driven moving vehicle 100 according to an embodiment of the present invention will be described in detail.

First, in the electrically driven moving vehicle 100 according to an embodiment of the present invention, the main body 110 includes the pair of driving wheels 111 arranged on the left side and the right side thereof, and the pair of electric motors 112a, 112b configured to drive the pair of driving wheels 111a, 111b, as illustrated in FIGS. 1 and 2.

Accordingly, an article to be transported is loaded on the main body 110, and the pair of driving wheels 111a, 111b is driven by the pair of electric motors 112a, 112b to conveniently transport the article to a desired place.

The main body 110 may be provided with a loading plate 115 on which the article to be transported is loaded.

As illustrated in FIG. 1, the handle 130 is generally parallel to the loading plate 115, and each end of the handle 130 is attached to the top of a generally "H" shaped structure connected to one side of the main body 110. Accordingly, the user can hold the handle 130 and apply a force in a direction in which the user wants to transport the article. More specifically, the handle 130 includes the left force sensor unit 131a, a right force sensor unit 131b, and the connection part 132 connecting the left force sensor unit 131a and the right force sensor unit 131b. The force sensor units 131a, 131b may include a strain gauge for measuring the force or pressure applied on the force sensor units 131a, 131b by the user. In addition, various devices capable of appropriately measuring applied force, such as a load cell, may be used.

As described above, in the electrically driven moving vehicle 100 according to an embodiment of the present invention, the connection part 132 is configured to connect the pair of force sensor units 131a, 131b to each other, so that the pair of force sensor units 131a, 131b receives and senses a force applied to the connection part 132 by the user. The user can operate the electrically driven moving vehicle 100 while holding the connection part 132, beyond a limitation that the user must hold a specific region, such as a region where a sensor is mounted, so as to apply a force.

In addition, since the connection part 132 is connected to both of the pair of force sensor units 131, the connection part 132 disperses the force applied by the user and transfers the force to the pair of force sensor units 131. Therefore, in applying the force to the connection part 132, the user may apply the force while holding the connection part 132 with only one hand, without using both hands.

The left force sensor unit 131a is configured to sense a force transferred to the left side or left end of the handle 130 among the forces applied by the user; and the right force sensor unit 131*b* is configured to sense a force transferred to the right side or right end of the handle 130 among the forces applied by the user.

Figure 3:
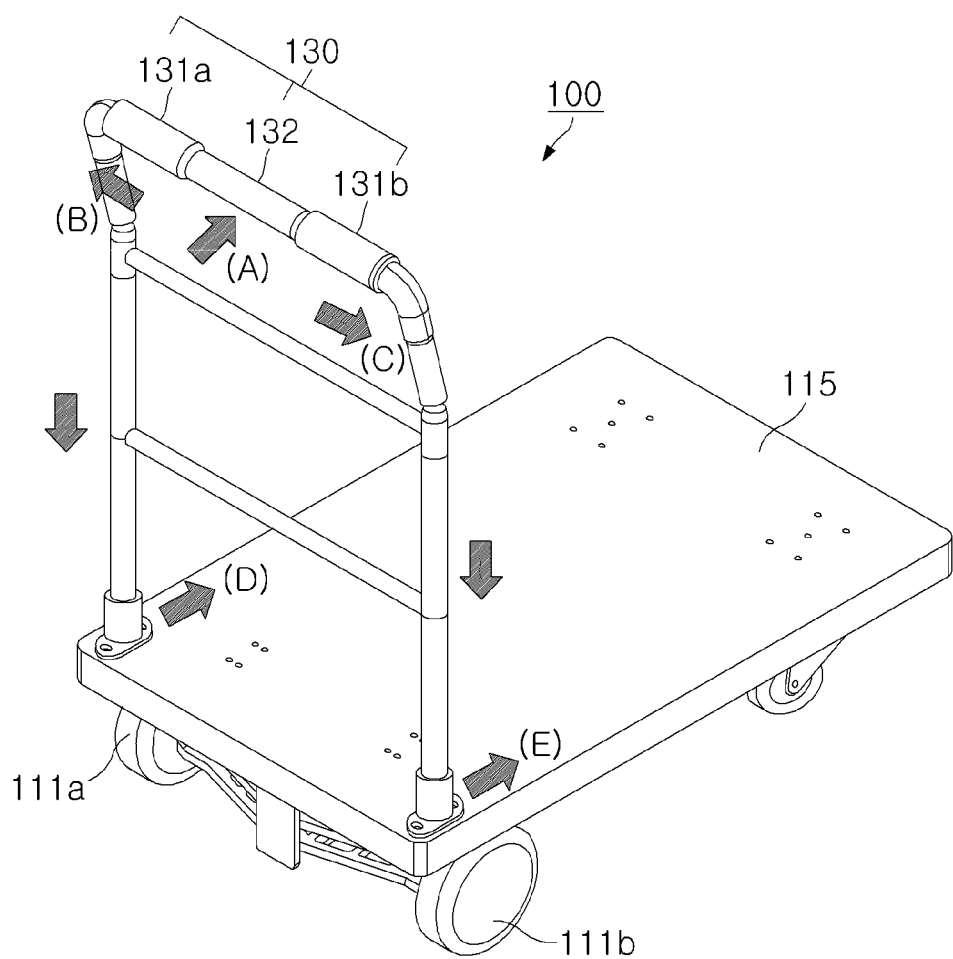
FIG. 3 is a diagram for describing a process of transferring a force applied by a user in the electrically driven moving vehicle according to an embodiment of the present invention.

The operation of the pair of force sensor units 131*a*, 131*b*, will be described in more detail with reference to FIG. 3. When the user holds the connection part 132 with one hand or both hands and applies a force in a direction in which the user wants to transport the loaded article ((A) of FIG. 3), a part of the force applied by the user is applied through the left force sensor unit 131*a* ((B) of FIG. 3) to the left side of the main body 110 ((D) of FIG. 3). In addition, a part of the force applied by the user is transferred through the right force sensor unit 131*b* ((C) of FIG. 3) to the right side of the main body 110 ((E) of FIG. 3).

At this time, when the pair of electric motors 112*a*, 112*b* is not driven, the electrically driven moving vehicle 100 may be moved in a direction in which the user wants to transport the article by the force applied by the user and transferred to the main body 110. However, the electrically driven moving vehicle 100 is driven only by the force applied by the user. Thus, when a heavy article is loaded, the user has a burden to apply a considerable force. Further, it is difficult to operate the electrically driven moving vehicle 100 to move in a proper direction.

On the other hand, the electrically driven moving vehicle 100 according to an embodiment of the present invention controls the operation of the pair of electric motors 112*a*, 112*b* so that the magnitude of the force transferred to the main body 110 is amplified while the direction of the force applied to the handle 130 by the user and transferred to the main body 110 is maintained. Therefore, even when a heavy article is loaded, the user can easily operate the electrically driven moving vehicle 100 to move to a desired place.

In addition, when the user operates the electrically driven moving vehicle 100, the user does not necessarily have to apply a predetermined force while holding the connection part 132. The user may also operate the electrically driven moving vehicle 100 by applying a force while directly holding the pair of force sensor units 131*a*, 131*b*.

Figure 4:
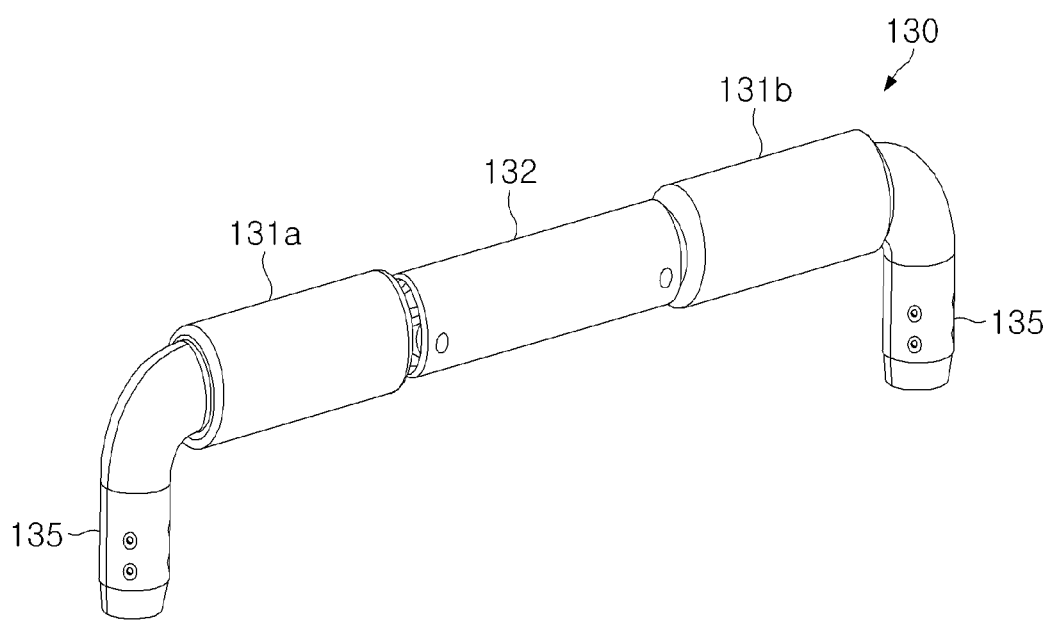
FIG. 4 is a perspective view of a handle according to an embodiment of the present invention.

FIG. 4 illustrates the structure of the handle 130 in the electrically driven moving vehicle 100 according to an embodiment of the present invention. Referring to FIG. 4, the handle 130 in the electrically driven moving vehicle 100 according to an embodiment of the present invention includes the left force sensor unit 131*a*, the right force sensor unit 131*b*, and the connection part 132 connecting the left force sensor unit 131*a* and the right force sensor unit 131*b*, and may further include fastening parts 135 used to fasten the handle 130 to the H-shaped structure for connecting to the main body 110.

Accordingly, the user can adjust the driving of the electrically driven moving vehicle 100 by applying a predetermined force while holding the left force sensor unit 131*a* and the right force sensor unit 131*b*. Alternatively, the user can adjust the driving of the electrically driven moving vehicle 100 by applying a predetermined force while holding the connection part 132, so that the applied force is transferred to the left force sensor unit 131*a* and the right force sensor unit 131*b* through the connection structure of the connection part 132 (described below) and the left and right force sensor units 131*a* and 131*b* and is sensed by the left force sensor unit 131*a* and the right force sensor unit 131*b*.

In addition, since the connection part 132 disperses the force applied by the user and transfers the force to the left force sensor unit 131*a* and the right force sensor unit 131*b*, the user may drive the electrically driven moving vehicle 100 by applying the force while holding the connection part 132 with only one hand, without using both hands.

Further, as one embodiment of the present invention, an elastic member 134 (shown in FIG. 5) having elasticity, such as polymer, may be used in portions in which the connection part 132 is connected to the left force sensor unit 131*a* and the right force sensor unit 131*b*. In this case, when a user applies a predetermined force, the connection part 132 is movable within a predetermined range according to the deformation of the elastic member 134, thereby enhancing the operation feeling of the user.

Figure 5:
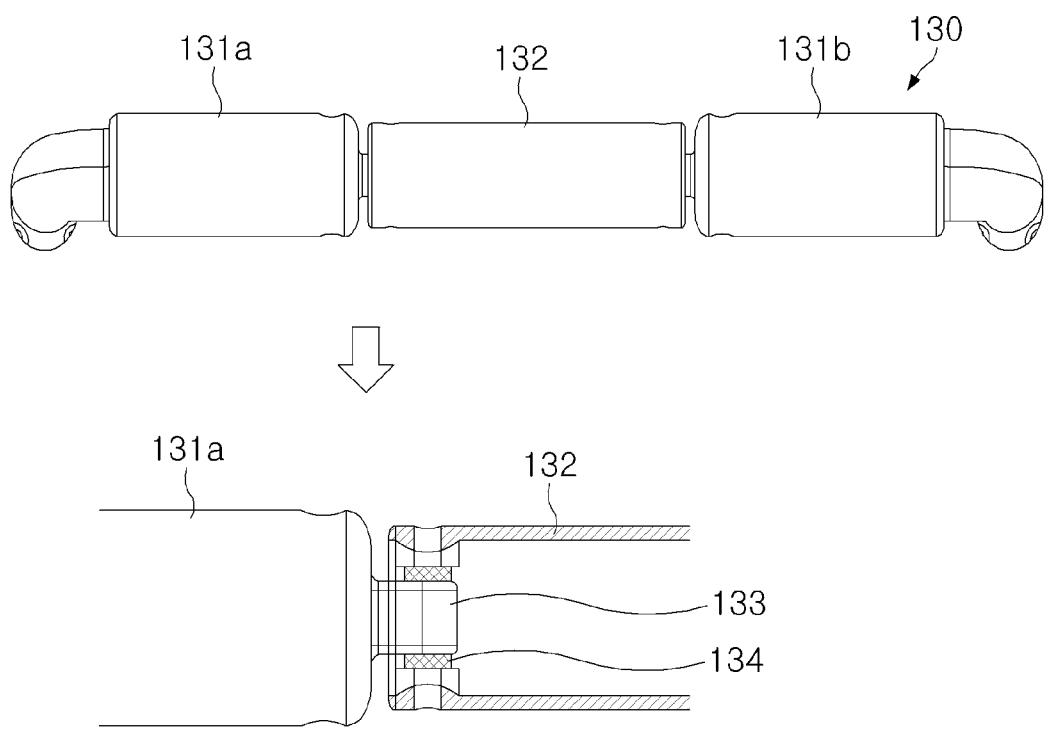
FIG. 5 is a diagram illustrating a coupling structure of a force sensor unit of a handle and a connection part, according to an embodiment of the present invention.

More specifically, FIG. 5 illustrates the connection structure of the connection part 132 and the force sensor units 131*a*, 131*b*, which include the elastic member 134 according to an embodiment of the present invention.

Referring to FIG. 5, each of the left force sensor unit 131*a* and the right force sensor unit 131*b* has a protrusion 133 on one side. The protrusion 133 is inserted into an opening of the connection part 132 to form a connection structure with the connection part 132 via the elastic member 134.

Accordingly, when the user applies a predetermined force while holding the connection part 132, the connection part 132 is movable within a predetermined range according to the deformation of the elastic member, thereby enhancing the operation feeling of the user. Furthermore, when the connection part 132 and the force sensor units 131*a*, 131*b* are coupled to each other by a bolt or the like, it is possible to effectively prevent an error that the force applied by the user is concentratedly transferred to only one of the specific force sensor units 131*a*, 131*b* according to the coupled state.

In addition, the electrically driven moving vehicle 100 according to an embodiment of the present invention includes the control unit 140 configured to control the driving of the pair of electric motors 112*a*, 112*b* by using sensing data generated by the pair of force sensor units 131*a*, 131*b*. The control unit 140 may comprise a CPU or a processor to control the electric motors 112*a*, 112*b*.

The control unit 140 may be provided in the main body 110, but embodiments of the present invention are not limited thereto. The control unit 140 may be provided in the handle 130. The control unit 140 may be provided at any positions as long as the operation of the control unit 140 can be appropriately performed.

The control unit 140 may control the pair of electric motors 112*a*, 112*b* to drive the electrically driven moving vehicle 100 by amplifying the magnitude of the force applied by the user while the driving direction of the electrically driven moving vehicle 100 by the force applied to the connection part 132 or the force sensor unit 131 by the user is maintained.

In the electrically driven moving vehicle 100 according to an embodiment of the present invention, a brushless DC (BLDC) motor or the like may be used as the electric motors 112*a*, 112*b*. In addition, any motor may be used as long as the motors can appropriately drive the electrically driven moving vehicle 100 under the control of the control unit 140.

Furthermore, the control unit 140 may control the currents applied to the electric motors 112*a*, 112*b* by taking into account the force applied to the connection part 132 or the force sensor units 131*a*, 131*b* by the user, so that the user can adjust the movement of the electrically driven moving vehicle 100 very intuitively and easily.

That is, in controlling the driving of the electric motors 112*a*, 112*b*, when the control unit 140 performs current control, the torque of the electric motors 112*a*, 112*b* is generated in proportion to the current applied to the electric motors 112*a*, 112*b*. In the electrically driven moving vehicle 100 according to an embodiment of the present invention, even when a user applies a small force, the force applied by the user is amplified to drive the electrically driven moving vehicle 100, so that the user moves the electrically driven moving vehicle 100 very intuitively and easily.

More specifically, when the user applies a small force so as to carefully move the electrically driven moving vehicle 100, the electrically driven moving vehicle 100 may be driven with a relatively small force even if the applied force is amplified. In addition, when the user applies a strong force, the amplified force becomes strong and thus the electrically driven moving vehicle 100 may be easily driven even if a heavy article is loaded and moved. Accordingly, the user may operate the driving of the electrically driven moving vehicle 100 very intuitively and easily.

On the other hand, in controlling the driving of the electric motors 112a, 112b, when a conventional speed control or the like is performed instead of the current control described above, the driving is controlled at a predetermined speed according to an operation of a user. In such a case, the user may feel an unnatural operation feeling as if using a control lever of a joystick.

Hereinafter, the operation of the electrically driven moving vehicle 100 according to an embodiment of the present invention will be described with reference to FIGS. 6A, 6B, and 6C.

Figure 6A:
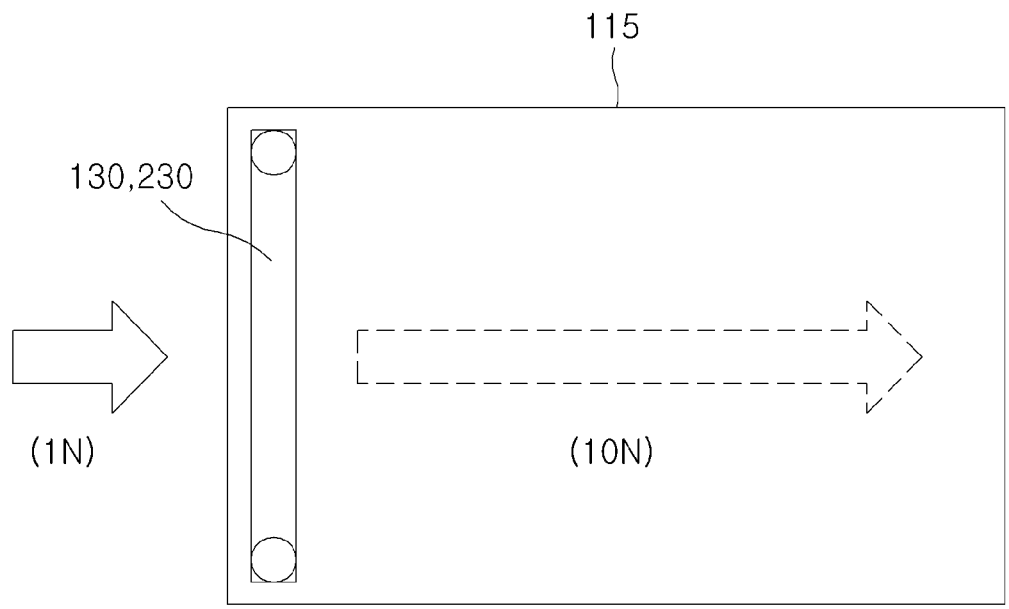

First, as illustrated in FIG. 6A, when a user horizontally applies a forward force to the connection part 132 so that the electrically driven moving vehicle 100 moves in a forward direction (e.g., a force of 1 N is applied in FIG. 6A), the force applied by the user is halved, and half of the force applied by the user is applied to the left side of the main body 110 through the left force sensor unit 131a of the handle 130. In addition, the other half of the force applied by the user is applied to the right side of the main body 110 through the right force sensor unit 131b of the handle 130.

At this time, the left force sensor unit 131a and the right force sensor unit 131b sense the force of 0.5 N, respectively. Accordingly, the control unit 140 controls currents applied to the left electric motor 112a and the right electric motor 112b so that the magnitude of the force applied by the user is amplified (that is, the force is amplified from 1 N to 10 N, for example, in FIG. 6A) while the driving direction of the electrically driven moving vehicle 100 by the force applied to the connection part 132 by the user is maintained, by taking into account the forces (each 0.5 N) sensed by the left force sensor unit 131a and the right force sensor unit 131b. Thus, in FIG. 6A, the same amount of current is applied to the left electric motor 112a and the right electric motor 112b.

Figure 6B:
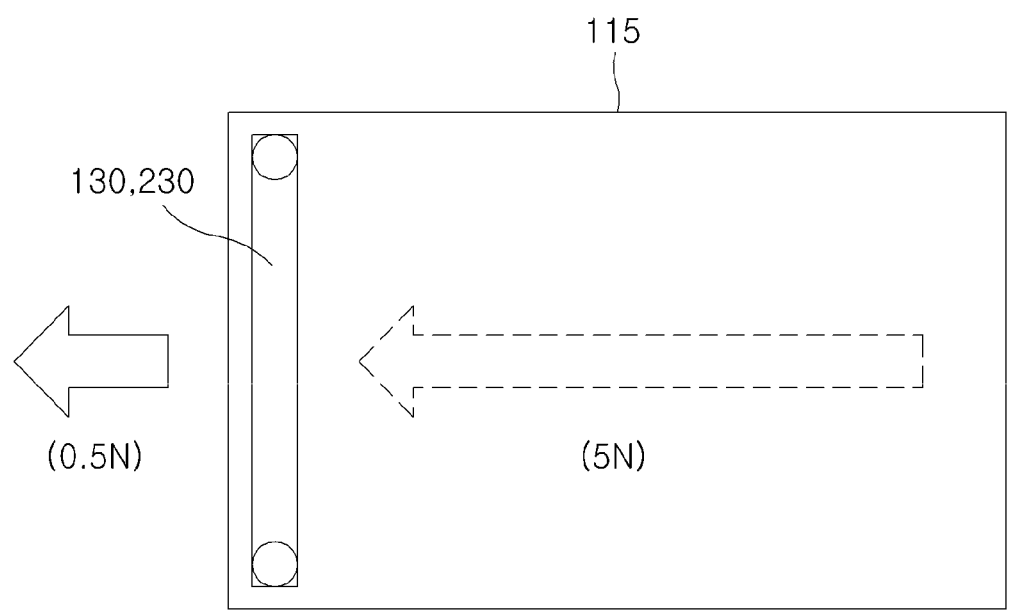

In addition, as illustrated in FIG. 6B, the present invention may be applied to a case where a backward force on the connection part 132 is applied in a backward direction opposite to the forward direction of the forward force applied in FIG. 6A.

As illustrated in FIG. 6B, when the user applies a force in a direction of pulling the connection part 132 so that the electrically driven moving vehicle 100 slowly moves backward (e.g., a force of 0.5 N is applied in FIG. 6B), the left force sensor unit 131a and the right force sensor unit 131b sense a force of 0.25 N, respectively. Accordingly, the control unit 140 controls currents applied to the left electric motor 112a and the right electric motor 112b so that the magnitude of the force applied by the user is amplified (that is, the force is amplified from 0.5 N to 5 N, for example, in FIG. 6B) while the direction of the force applied to the connection part 132 by the user is maintained, by taking into account the forces (each 0.25 N) sensed by the left force sensor unit 131a and the right force sensor unit 131b.

In addition, when the force applied by the user is amplified to drive the electrically driven moving vehicle 100, the force is not always amplified at a predetermined amplification ratio. The force applied by the user may be amplified by various methods. For example, the amplification ratio may be changed according to the applied force, or the magnitude of the force may be preset.

Furthermore, referring to FIG. 6C, even when a force is applied in a direction inclined with respect to the forward and backward directions, the operation of the pair of electric motors 112a, 112b may be controlled so that the magnitude of the force is amplified while the driving direction of the electrically driven moving vehicle 100 by the force applied by the user is maintained. Accordingly, the user may turn the electrically driven moving vehicle 100 in a desired direction, or may move the electrically driven moving vehicle 100 in an intended direction.

More specifically, referring to FIG. 6C, when the user applies a force to the connection part 132 in a predetermined direction (a force of 1 N is applied in FIG. 6C), the force applied by the user is divided at a predetermined ratio according to the direction. A part of the force is applied to the left side of the main body 110 through the left force sensor unit 131a of the handle 130, and the remaining force is applied to the right side of the main body 110 through the right force sensor unit 131b of the handle 130.

At this time, when the left force sensor unit 131a senses a force of a [N] and the right force sensor unit 131b senses a force of b [N], different from the amount of force applied to the left force sensor unit 131a, the control unit 140 controls currents applied to the left electric motor 112a and the right electric motor 112b so that the magnitude of the force applied by the user is amplified while the direction of the force applied to the connection part 132 by the user is maintained, by taking into account the forces sensed by the left force sensor unit 131a and the right force sensor unit 131b.

For example, the control unit 140 controls the currents of the left electric motor 112a and the right electric motor 112b so that the left driving wheel 111a generates a force of 10a [N] and the right driving wheel 111b generates a force of 10b [N], so that the magnitude of the force is amplified to 10 N while the direction of the force applied by the user and transferred to the main body 110 is maintained. Accordingly, the user may turn the electrically driven moving vehicle 100 in a desired direction, or may move the electrically driven moving vehicle 100 in an intended direction.

In the electrically driven moving vehicle 100 according to an embodiment of the present invention, when the control unit 140 controls the pair of electric motors 112a, 112b, the control unit 140 may control currents applied to the pair of electric motors 112a, 112b by using a PWM signal. Accordingly, the torque of the electric motors 112a, 112b proportional to the currents applied to the electric motors 112a, 112b is adjusted so that the user may operate the electrically driven moving vehicle 100 very intuitively and easily.

FIG. 7 illustrates PWM signals having various duty ratios, which are used for controlling the currents applied to the electric motors 112a, 112b by the control unit 140 of the electrically driven moving vehicle 100 according to an embodiment of the present invention.

Referring to FIG. 7, the control unit 140 of the electrically driven moving vehicle 100 according to an embodiment of the present invention may effectively control the currents applied to the electric motors 112a, 112b by using the PWM signals.

Figure 8:
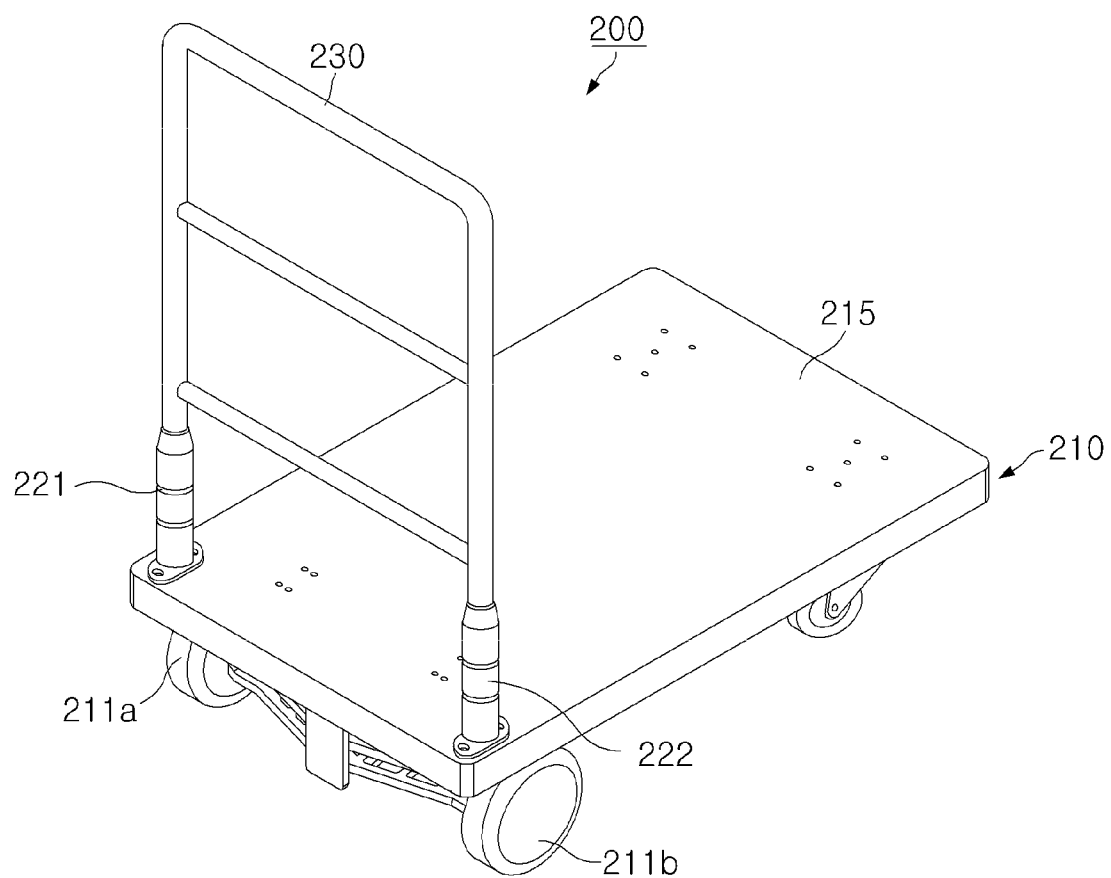
FIG. 8 is a perspective view of an electrically driven moving vehicle according to another embodiment of the present invention.
Figure 9:
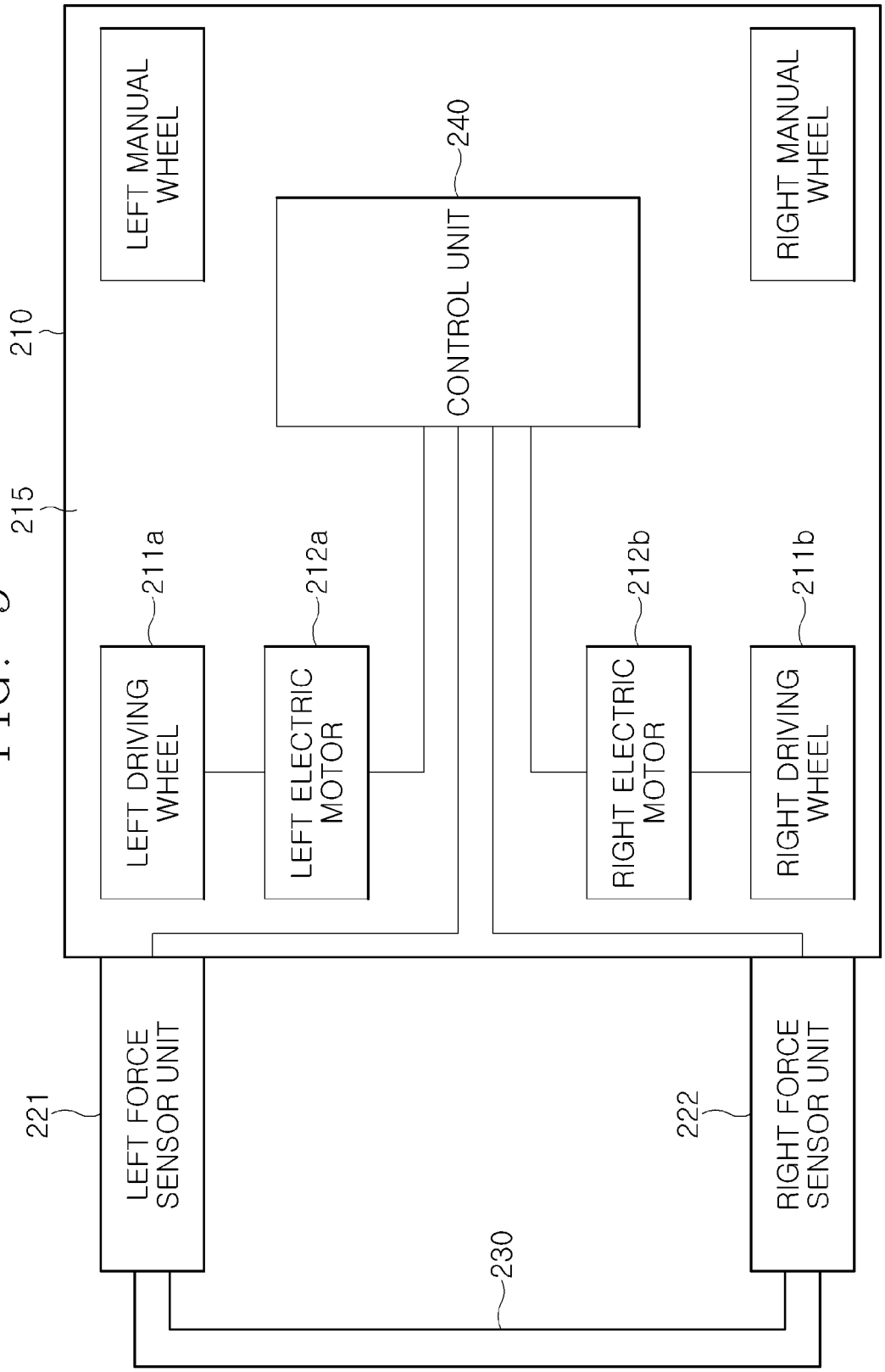
FIG. 9 is a configuration diagram of the electrically driven moving vehicle according to another embodiment of the present invention.

FIG. 8 is a perspective view of an electrically driven moving vehicle 200 according to another embodiment of the present invention. Also, FIG. 9 is a configuration diagram of the electrically driven moving vehicle 200 according to another embodiment of the present invention. The electrically driven moving vehicle 200 according to another embodiment of the present invention will be described below with reference to FIGS. 8 and 9.

Referring to FIGS. 8 and 9, the electrically driven moving vehicle 200 according to another embodiment of the present invention is an electrically driven moving vehicle for loading and moving an article to be transported, and may include: a main body 210 including a pair of driving wheels 211a, 211b, one arranged on the left side and the other on the right side of the main body 210, a pair of electric motors 212a, 212b each configured to drive one of the corresponding one of the pair of driving wheels 211a, 211b, and a loading plate 215 on which the article to be transported is loaded; a handle 230 generally in the shape of an inverted "U" securely connected to one side of the main body 210; a pair of force sensor units 221, 222 provided near the left and right ends of the handle 230 near the upper portion of the loading plate 215 and configured to sense a force applied to the handle 230 by the user and transferred to the main body 210; and a control unit 240 configured to control the driving of the pair of electric motors 212a, 212b by taking into account the force transferred to the main body 210.

Hereinafter, each component of the electrically driven moving vehicle 200 according to another embodiment of the present invention will be described in detail.

First, in the electrically driven moving vehicle 200 according to an embodiment of the present invention, the main body 210 includes the pair of driving wheels 211a, 211b arranged on left side and the right side of the main body 210, the pair of electric motors 212a, 212b configured to drive the pair of driving wheels 212a, 212b, and the loading plate 215 on which the article to be transported is loaded, as illustrated in FIGS. 8 and 9.

Accordingly, the article to be transported is loaded on the loading plate 215 of the main body 210, and the pair of driving wheels 211a, 211b is driven by the pair of electric motors 212a, 212b to conveniently transport the article to a desired place.

In addition, the electrically driven moving vehicle 200 according to another embodiment of the present invention may include the handle 230, which can be held by a user, on one side of the main body 210. Accordingly, the user can hold the handle 230 and apply a force in a direction in which the user wants to transport the article.

In the electrically driven moving vehicle 200 according to another embodiment of the present invention, the pair of force sensor units 220 is provided near the left and right ends of the handle 230, near the main body 210 and configured to sense the force applied to the handle 230 by the user and transferred to the main body 210.

The force sensor units 221, 221 may include a strain gauge. In addition, various sensors capable of appropriately measuring applied force, such as a load cell, may be used.

As illustrated in FIG. 8, the pair of force sensor units 221, 22 may be provided near the left and right ends of the handle 230 proximate the upper side of the loading plate 215 on which the article to be transported is loaded. Accordingly, the pair of force sensor units 221, 222 may accurately and effectively sense the force applied to the handle 230 by the user and transferred to the main body 210.

More specifically, the left force sensor unit 221 is configured to sense a force transferred to the left end of the handle 230 among the forces applied by the user; and the right force sensor unit 222 is configured to sense a force transferred to the right end of the handle 230 among the forces applied by the user.

Accordingly, in the electrically driven moving vehicle 200 according to another embodiment of the present invention, the pair of force sensor units 221, 222 is provided on a path through which the force applied by the user is transferred, so that the user may easily operate the electrically driven moving vehicle 200 even with one hand, without using both hands.

Figure 10:
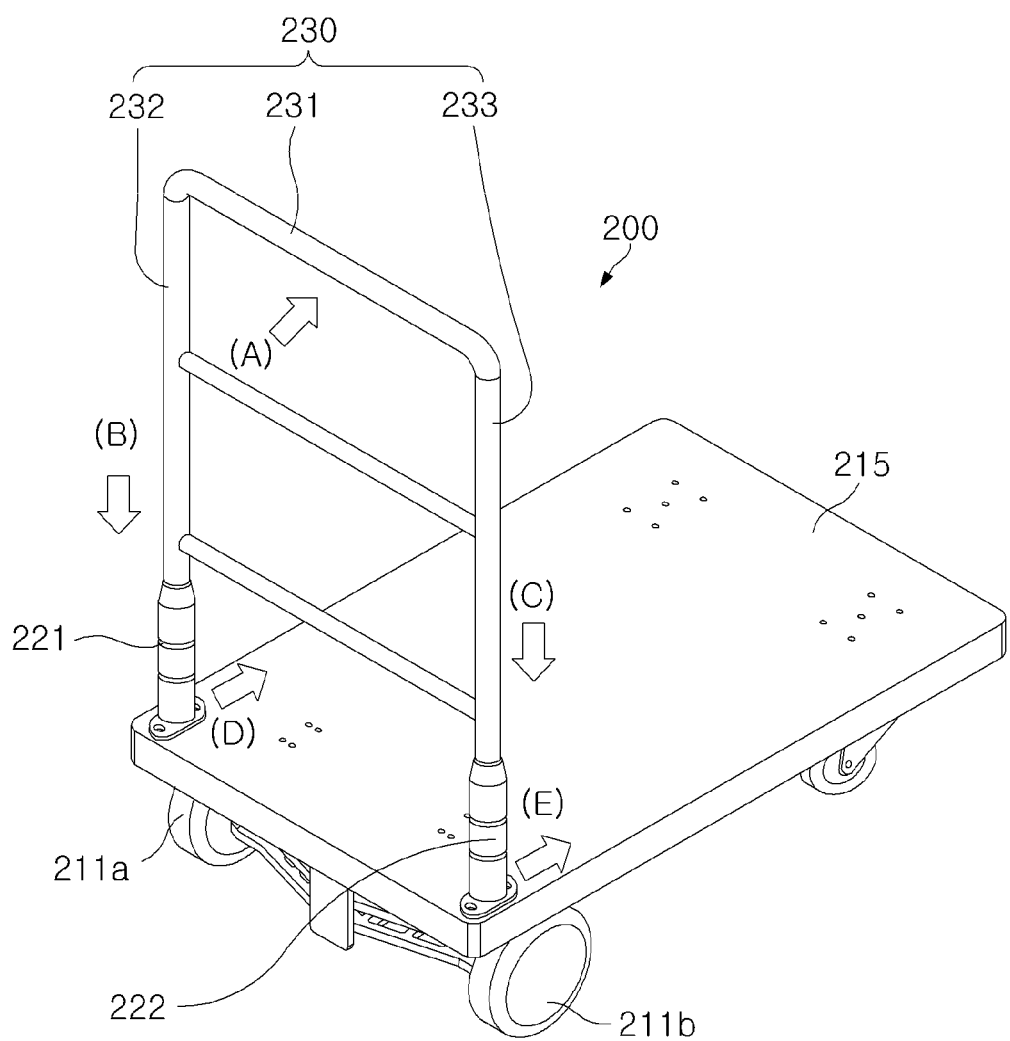
FIG. 10 is a diagram for describing a process of transferring a force applied by a user in the electrically driven moving vehicle according to another embodiment of the present invention.

The operation of the pair of force sensor units 221, 222 will be described in more detail with reference to FIG. 10. When the user holds the handle 230 with one hand or both hands and applies a force in a direction in which the user wants to transport the loaded article ((A) of FIG. 10), a part of the force applied by the user is applied through the left side leg 232 of the handle 230 and the left force sensor unit 221 ((B) of FIG. 10) to the left side of the main body 210 ((D) of FIG. 10). In addition, a part of the force applied by the user is transferred through the right side leg 233 of the handle 230 and the right force sensor unit 222 ((C) of FIG. 10) to the right side of the main body 210 ((E) of FIG. 10).

At this time, when the pair of electric motors 212 is not driven, the electrically driven moving vehicle 200 may be moved in a direction in which the user wants to transport the article by the force applied by the user and transferred to the main body 210. However, the electrically driven moving vehicle 200 is driven only by the force applied by the user. Thus, when a heavy article is loaded, the user has a burden to apply a considerable force. Further, it is difficult to operate the electrically driven moving vehicle 200 to move in a proper direction.

On the other hand, the electrically driven moving vehicle 200 of the present invention controls the operation of the pair of electric motors 212a, 212b so that the magnitude of the force transferred to the main body 210 is amplified to drive the electrically driven moving vehicle 200 while the driving direction of the electrically driven moving vehicle 200 by the force applied by the user and transferred to the main body 110 is maintained. Therefore, even when a heavy article is loaded, the user can easily operate the electrically driven moving vehicle 200 to move to a desired place.

In addition, the electrically driven moving vehicle 200 of the present invention includes the control unit 240 configured to control the driving of the pair of electric motors 212a, 212b by using sensing data generated by the pair of force sensor units 221, 222.

The control unit 240 may be provided in the main body 210, but embodiments of the present invention are not limited thereto. The control unit 240 may be provided in the handle 230. The control unit 240 may be provided at any positions as long as the operation of the control unit 240 can be appropriately performed.

The control unit 240 may control the pair of electric motors 212 to drive the electrically driven moving vehicle 200 by amplifying the magnitude of the force transferred to the main body 210 while the driving direction of the electrically driven moving vehicle 200 by the force applied to the handle 230 and transferred to the main body 210 is maintained.

In the electrically driven moving vehicle 200 according to another embodiment of the present invention, a BLDC motor or the like may be used as the electric motors 212a, 212b. In addition, any motors may be used as long as the motors can appropriately drive the electrically driven moving vehicle 200 under the control of the control unit 240.

Furthermore, the control unit 240 may control the currents applied to the electric motors 212 by taking into account the force applied to the connection part 232 or the force sensor units 220 by the user, so that the user can adjust the movement of the electrically driven moving vehicle 200 very intuitively and easily.

That is, in controlling the driving of the electric motors 212a, 212b, when the control unit 240 performs current control, the torque of the electric motors 212 is generated in proportion to the currents applied to the electric motors 212. In the electrically driven moving vehicle 200 according to another embodiment of the present invention, even when a user applies a small force, the force applied by the user is amplified to drive the electrically driven moving vehicle 200, so that the user moves the electrically driven moving vehicle 200 very intuitively and easily.

More specifically, when the user applies a small force so as to carefully move the electrically driven moving vehicle 200, the electrically driven moving vehicle 200 may be driven with a relatively small force even if the applied force is amplified. In addition, when the user applies a strong force, the amplified force becomes strong and thus the electrically driven moving vehicle 200 may be easily driven even if a heavy article is loaded and moved. Accordingly, the user may operate the driving of the electrically driven moving vehicle 200 very intuitively and easily.

On the other hand, in controlling the driving of the electric motors 212, when a conventional speed control or the like is performed instead of the current control described above, the driving is controlled at a predetermined speed according to an operation of a user. In such a case, the user may feel an unnatural operation feeling as if using a control lever of a joystick.

Hereinafter, the operation of the electrically driven moving vehicle 200 of the present invention will be described with reference to FIGS. 6A, 6B, and 6C.

First, as illustrated in FIG. 6A, when a user horizontally applies a force to the handle 230 so that the electrically driven moving vehicle 200 moves in a forward direction (a force of 1 N is applied in FIG. 6A), the force applied by the user is halved, and half of the force applied by the user is applied to the left side of the main body 210 through the left side leg 232 of the handle 230 and the left force sensor unit 221.

In addition, the other half of the force applied by the user is applied to the right side of the main body 210 through the right side leg 233 of the handle 230 and the right force sensor unit 222.

At this time, the left force sensor unit 221 and the right force sensor unit 222 sense the force of 0.5 N, respectively. Accordingly, the control unit 240 controls currents applied to the left electric motor 212a and the right electric motor 212b so that the magnitude of the force transferred to the main body 210 is amplified (that is, the force is amplified from 1 N to 10 N in FIG. 6A) to drive the electrically driven moving vehicle 200 while the driving direction of the electrically driven moving vehicle 200 by the force applied to the handle 230 by the user and transferred to the main body 210 is maintained, by taking into account the forces (each 0.5 N) sensed by the left force sensor unit 221 and the right force sensor unit 222. Thus, in FIG. 6A, the same amount of current is applied to the left electric motor 212a and the right electric motor 212b.

In addition, as illustrated in FIG. 6B, the present invention may be applied to a case where a backward force is applied on the handle 230 in a backward direction opposite to the forward direction of the force applied in FIG. 6A.

As illustrated in FIG. 6B, when the user applies a force in a direction of pulling the handle 230 so that the electrically driven moving vehicle 200 slowly moves backward (a force of 0.5 N is applied in FIG. 6B), the left force sensor unit 221 and the right force sensor unit 222 sense a force of 0.25 N, respectively. Accordingly, the control unit 240 controls currents applied to the left electric motor 212a and the right electric motor 212b so that the magnitude of the force transferred to the main body 210 is amplified (that is, the force is amplified from 0.5 N to 5 N in FIG. 6B) to drive the electrically driven moving vehicle 200 while the driving direction of the electrically driven moving vehicle 200 by the force applied to the handle 230 by the user and transferred to the main body 210 is maintained, by taking into account the forces (each 0.25 N) sensed by the left force sensor unit 221 and the right force sensor unit 222.

In addition, when the force applied by the user is amplified to drive the electrically driven moving vehicle 200, the force is not always amplified at a predetermined amplification ratio. The force applied by the user may be amplified by various methods. For example, the amplification ratio may be changed according to the applied force, or the magnitude of the force may be preset.

Furthermore, referring to FIG. 6C, even when a force is applied in a direction inclined with respect to a forward and backward directions, the operation of the pair of electric motors 212a, 212b may be controlled so that the magnitude of the force is amplified to drive the electrically driven moving vehicle 200 while the driving direction of the electrically driven moving vehicle 200 by the force applied by the user and transferred to the main body 210 is maintained. Accordingly, the user may turn the electrically driven moving vehicle 200 in a desired direction, or may move the electrically driven moving vehicle 200 in an intended direction.

More specifically, referring to FIG. 6C, when the user applies a force to the handle 230 in a predetermined direction (a force of 1 N is applied in FIG. 6C), the force applied by the user is divided at a predetermined ratio according to the direction. A part of the force is applied to the left side of the main body 210 through the left side leg 232 of the handle 230 and the left force sensor unit 221, and the remaining force is applied to the right side of the main body 210 through the right side leg 233 of the handle 230 and the right force sensor unit 222.

At this time, when the left force sensor unit 221 senses a force of a [N] and the right force sensor unit 222 senses a force of b [N], different from the amount of force applied to the left force sensor unit 131a, the control unit 240 controls currents applied to the left electric motor 212a and the right electric motor 212b so that the magnitude of the force transferred to the main body 210 is amplified to drive the electrically driven moving vehicle 200 while the driving direction of the electrically driven moving vehicle 200 by the force applied to the handle 230 by the user and transferred to the main body 210 is maintained, by taking into account the forces sensed by the left force sensor unit 221 and the right force sensor unit 222.

For example, the control unit 240 controls the currents of the left electric motor 212a and the right electric motor 212b so that the left driving wheel 211a generates a force of 10a [N] and the right driving wheel 211b generates a force of 10b [N], so that the magnitude of the force is amplified to 10 N while the driving direction of the electrically driven moving vehicle 200 by the force applied by the user and transferred to the main body 211 is maintained. Accordingly, the user may turn the electrically driven moving vehicle 200 in a desired direction, or may move the electrically driven moving vehicle 200 in an intended direction.

Figure 11:
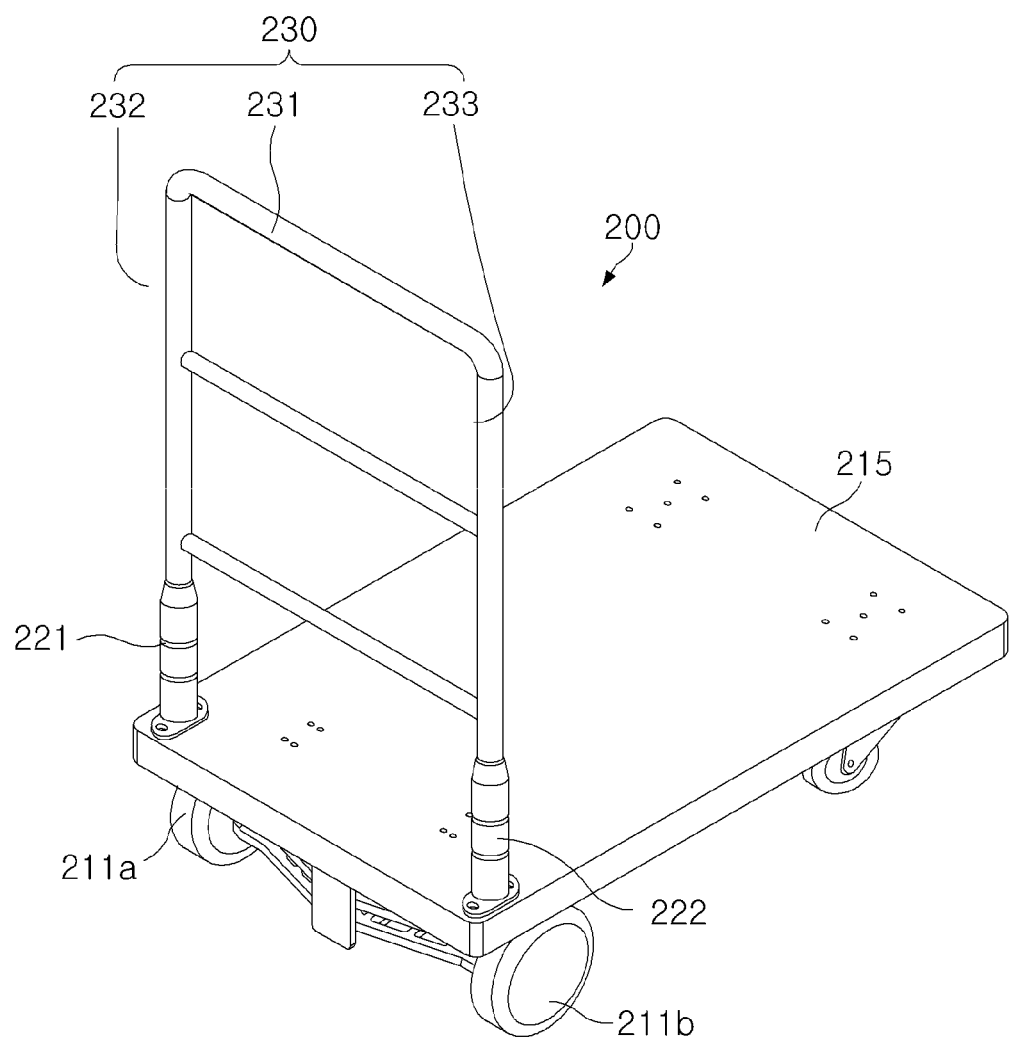
FIG. 11 is a diagram of an upper handle and side handles, according to another embodiment of the present invention.

In addition, as illustrated in FIG. 11, in the electrically driven moving vehicle 200 of the present invention, the handle 230 may include an upper portion 231 having a horizontal rod structure, and side legs 232 and 233 connected to left and right ends of the upper portion 231 and provided in a vertical direction.

Accordingly, as illustrated in FIG. 11, even when the user holds the side legs 232 and 233 and moves the electrically driven moving vehicle 200, the left force sensor unit 221 and the right force sensor unit 222 sense the force applied to the handle 230, and the magnitude of the force is amplified to drive the electrically driven moving vehicle 200 while the driving direction of the electrically driven moving vehicle by the force applied by the user is maintained.

Figure 12A:
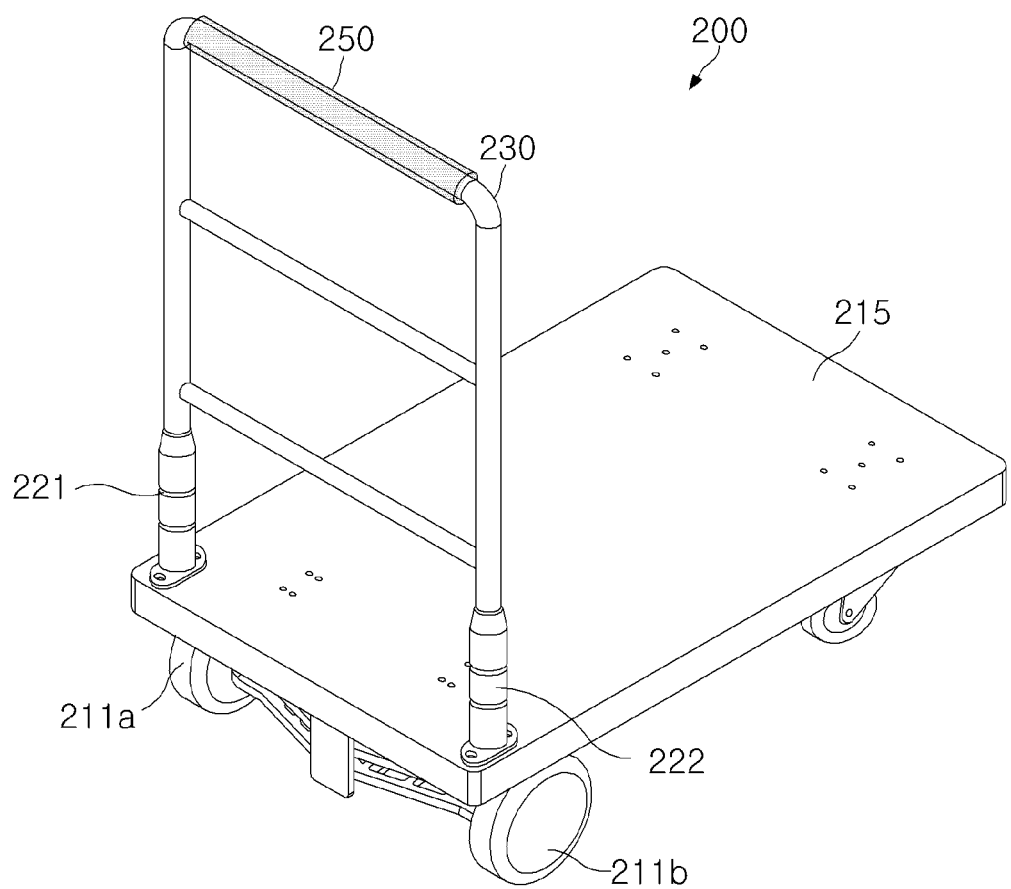
FIGS. 12A and 12B are diagrams of an electrically driven moving vehicle including a second sensor, according to another embodiment of the present invention.

In addition, as illustrated in FIG. 12A, the electrically driven moving vehicle 200 according to another embodiment of the present invention may include a second sensor 250 configured to sense the user's holding of the handle 230.

A touch sensor or the like may be used as the second sensor 250, and any sensors may be used without special limitation as long as the sensors can appropriately sense the user's holding of the handle 230.

Figure 12B:
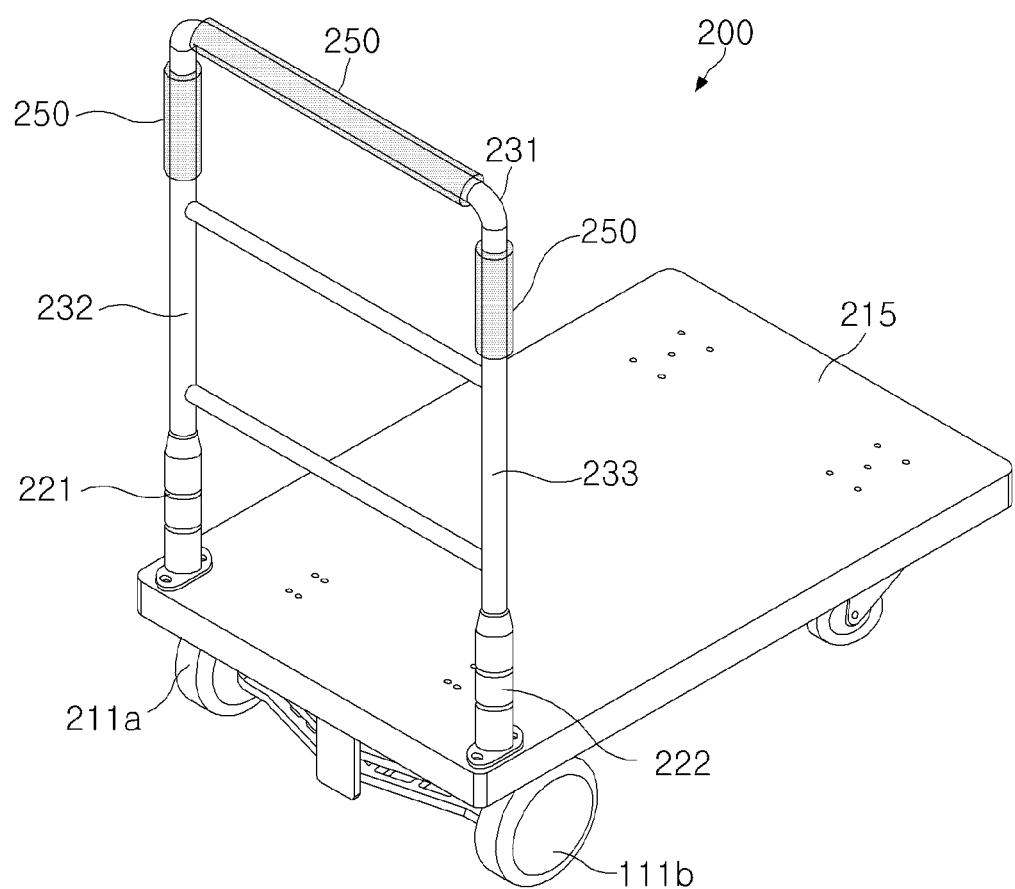

In addition, while a case where one second sensor 250 is provided on the handle 230 is illustrated in FIG. 12A, embodiments of the present invention are not limited thereto. A plurality of the second sensors 250 may be provided in a plurality of regions of the upper handle 231. Furthermore, as illustrated in FIG. 12B, the second sensors 250 may be provided in both the upper handle 231 and the side legs 232 and 233. The second sensor 250 may be provided at various positions by taking into account the usage environment.

As described above, since the second sensor 250 such as the touch sensor is provided in the handle 230, the control unit 240 may drive the pair of electric motors 212a, 212b by taking into account the force transferred to the main body 210 only when the user holds (touches) the handle 230. Thus, it is possible to prevent the electrically driven moving vehicle 200 from being driven by itself due to an intended cause even when the user does not hold and operate the handle 230.

Figure 13:
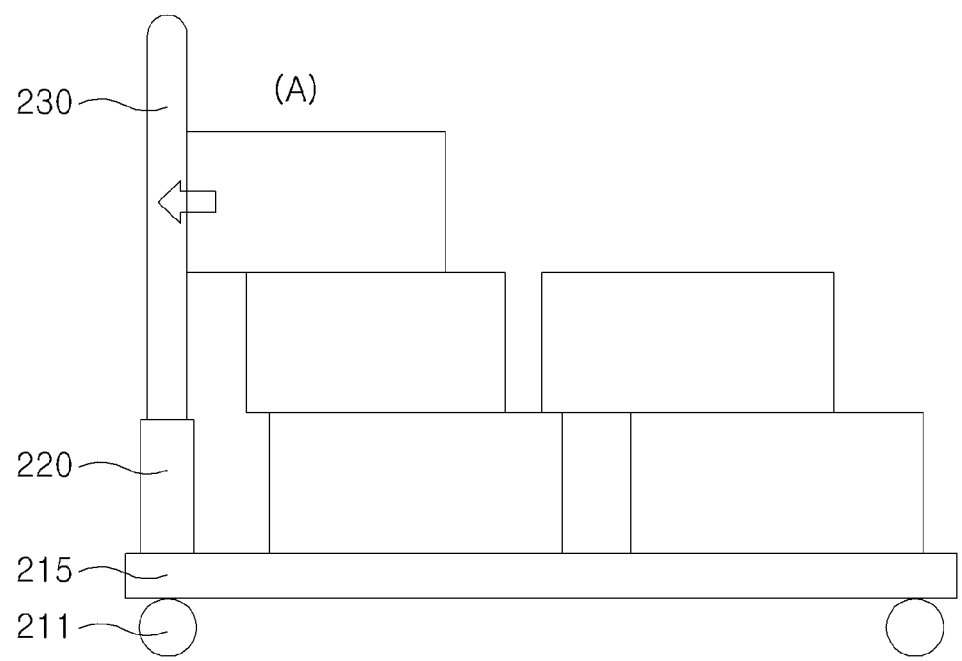
FIG. 13 is a diagram for describing a case where a malfunction caused by a load or the like is prevented by using a second sensor, according to another embodiment of the present invention.

More specifically, as illustrated in FIG. 13, a case where predetermined articles to be transported are loaded on the loading plate 215 is considered. Some articles may come into contact with the handle 230 or the like to apply a predetermined force ((A) of FIG. 13), depending on the loaded state of the articles. In this case, the control unit 240 recognizes the force applied by the article as the force applied by the user and drives the electric motors 212, which causes the electrically driven moving vehicle 200 to move by itself.

In this regard, in the electrically driven moving vehicle 200 according to the embodiment of the present invention in which the second sensor 250 is provided in a partial or entire region of the handle 230 to sense the user's holding the handle 230, the pair of electric motors is driven by taking into account the force transferred to the main body 210 only when the user holds the handle 230.

In addition, in the electrically driven moving vehicle 200 according to another embodiment of the present invention, the control unit 240 calculates the force sensed by the force sensor units 221, 222 when the user holds the handle 230, as a force externally applied by causes other than the user (for example, a force applied by the loaded articles as illustrated in FIG. 13), calculates a correction value by subtracting the externally applied force from the force sensed by the force sensor unit 220 (that is, subtracting the force applied by the loaded articles from the sum of the force applied by the user and the force applied by the loaded articles), and drives the electric motors 212a, 212b by using the correction value. Therefore, the movement of the electrically driven moving vehicle 200 may be adjusted by more accurately calculating the force applied by the user.

In addition, in the electrically driven moving vehicle 200 according to the present invention, when the control unit 240 controls the pair of electric motors 212a, 212b, the control unit 240 may control currents applied to the pair of electric motors 212 by using a PWM signal. Accordingly, the torque of the electric motors 212a, 212b proportional to the currents applied to the electric motors 212 is adjusted so that the user may operate the electrically driven moving vehicle 200 very intuitively and easily.

Furthermore, as described with reference to FIG. 7, the control unit 240 of the electrically driven moving vehicle 200 according to the present invention may use PWM signals having various duty ratios so as to control the currents applied to the electric motors 212a, 212b.

Accordingly, the control unit 240 of the electrically driven moving vehicle 200 according to the present invention may effectively control the currents applied to the electric motors 212a, 212b by using the PWM signals.

According to one or more embodiments, the user may operate the electrically driven moving vehicle while holding a position convenient for the user rather than a specific position of the handle.

According to one or more embodiments, the user may easily operate the electrically driven moving vehicle even with one hand, without using both hands.

According to one or more embodiments, the force transferred to the force sensor unit when the user holds the handle is calculated as a basic force applied by causes other than the user, and the driving of the electric motors is controlled by taking into account the calculated force, thereby preventing the electrically driven moving vehicle from being driven by the force applied by the causes other than the user.

According to one or more embodiments, the force applied by the user is sensed, and the currents applied to the electric motors are controlled according to the sensed force, so that the magnitude of the force is amplified to drive the electrically driven moving vehicle while the driving direction of the electrically driven moving vehicle by the force applied by the user is maintained. Therefore, the user may operate the electrically driven moving vehicle intuitively and easily.

Although preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments of the present invention are disclosed only for illustrative purposes and should not be construed as limiting the present invention.

What is claimed is:

1. An electrically driven moving vehicle for moving an article, comprising:

a main body including a pair of driving wheels each arranged on a left side and a right side of the main body, and a pair of electric motors configured to drive the pair of driving wheels;

a handle secured to one side of the main body and having a longitudinal axis;

a left force sensor unit provided on a left side of the handle along said longitudinal axis, said left force sensor having a gripping surface configured to enable a user to grip said left force unit;

a right force sensor unit provided on a right side of the handle along said longitudinal axis, said right force sensor having a gripping surface configured to enable the user to grip said right force unit;

a connection part provided on the handle along said longitudinal axis, said connection part being connected to and movable relative to the left force sensor unit and the right force sensor unit, wherein a force applied to the connection part is transferred to the left force sensor unit and the right force sensor unit; and a control unit configured to control driving of the pair of electric motors by taking into account a force applied on the left and right sensor units or the connection part, and sensed by, the left and right force sensor units.

2. The electrically driven moving vehicle of claim 1, further comprising an elastic member provided in a portion in which the connection part and the left and right force sensor units are connected to each other, wherein, when a user applies a predetermined force to the connection part, the connection part is movable within a predetermined range according to deformation of the elastic member.

3. The electrically driven moving vehicle of claim 1, wherein the left and right force sensor units receive and sense a force applied by a user from the connection part, or sense a force directly applied to at least one of the left and right force sensor units by the user.

4. The electrically driven moving vehicle of claim 2, wherein an opening is provided at each end of the connection part, a protrusion is provided on one side of the left force sensor unit and the right force sensor unit, and the protrusions are inserted into the openings of the connection part to form a connection structure with the connection part via the elastic member.

5. The electrically driven moving vehicle of claim 1, wherein the control unit controls the driving of the electric motors so that magnitude of the force transmitted to the main body is amplified to drive the electrically driven moving vehicle while a driving direction of the electrically driven moving vehicle by the force applied to the handle by the user and transferred to the main body is maintained.

6. The electrically driven moving vehicle of claim 5, wherein the control unit controls a current applied to a left electric motor driving a left driving wheel of the driving wheels by taking into account the force sensed by the left force sensor unit, and controls a current applied to a right electric motor driving a right driving wheel of the driving wheels by taking into account the force sensed by the right force sensor unit.

7. The electrically driven moving vehicle of claim 1, wherein said connection part pivots about an axis that is transverse to said longitudinal axis.

* * * * *